(12) United States Patent
Robillon et al.

(10) Patent No.: US 11,009,294 B2
(45) Date of Patent: May 18, 2021

(54) DEVICE FOR COOLING AN ENERGY STORAGE UNIT, AND ASSOCIATED ASSEMBLY

(71) Applicant: Valeo Systemes Thermiques, Le Mesnil Saint Denis (FR)

(72) Inventors: Lionel Robillon, La Suze sur Sarthe (FR); Jean Damien Muller, La Suze sur Sarthe (FR); Mohamed Ibrahimi, La Suze sur Sarthe (FR); Alain Pourmarin, La Suze sur Sarthe (FR); Boris Barre, La Suze sur Sarthe (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 40 days.

(21) Appl. No.: 16/320,250

(22) PCT Filed: Jul. 20, 2017

(86) PCT No.: PCT/FR2017/051984
§ 371 (c)(1),
(2) Date: Jan. 24, 2019

(87) PCT Pub. No.: WO2018/020108
PCT Pub. Date: Feb. 1, 2018

(65) Prior Publication Data
US 2019/0234688 A1    Aug. 1, 2019

(30) Foreign Application Priority Data
Jul. 25, 2016 (FR) .......................... 1657111

(51) Int. Cl.
*F28D 1/04* (2006.01)
*H01M 10/6556* (2014.01)
(Continued)

(52) U.S. Cl.
CPC .......... *F28D 1/0461* (2013.01); *B23K 1/0012* (2013.01); *H01M 10/625* (2015.04); *H01M 10/6556* (2015.04); *B23K 2101/14* (2018.08)

(58) Field of Classification Search
CPC .. F28D 1/05366; F28D 1/0461; F28D 9/0043; F28D 9/0031; F28D 9/00;
(Continued)

(56) References Cited

U.S. PATENT DOCUMENTS

| 5,562,157 A | 10/1996 | Hasegawa et al. |
| 2007/0199333 A1 | 8/2007 | Windisch |

(Continued)

FOREIGN PATENT DOCUMENTS

| CN | 101313639 A | 11/2008 |
| CN | 102748979 | * 10/2012 |

(Continued)

OTHER PUBLICATIONS

Translation of Second Office Action in corresponding Chinese Application No. 201780057624.9, dated Mar. 10, 2021 (13 pages) (Year: 2021)*

(Continued)

*Primary Examiner* — Joseph F Trpisovsky
(74) *Attorney, Agent, or Firm* — Osha Bergman Watanabe & Burton LLP

(57) ABSTRACT

A device for cooling an electrical energy storage unit includes at least one tube exchanger and one plate exchanger, the tube exchanger and the plate exchanger being in fluid communication such as to form a circuit for circulation of a cooling fluid.

17 Claims, 3 Drawing Sheets

(51) Int. Cl.
  *H01M 10/625* (2014.01)
  *B23K 1/00* (2006.01)
  *B23K 101/14* (2006.01)

(58) Field of Classification Search
  CPC . F28F 9/26; F28F 9/268; F25B 39/022; F25B 39/024; H01M 10/625; H01M 10/6556; B60H 1/00278; B60H 2001/00307; B23K 1/0012
  See application file for complete search history.

(56) References Cited

U.S. PATENT DOCUMENTS

| | | | |
|---|---|---|---|
| 2011/0240280 A1* | 10/2011 | Izumi | C22C 21/00 165/185 |
| 2012/0107663 A1 | 5/2012 | Burgers et al. | |
| 2013/0295422 A1 | 11/2013 | Kim et al. | |
| 2013/0309543 A1 | 11/2013 | Kim et al. | |
| 2014/0011059 A1* | 1/2014 | Hashimoto | B60L 1/003 429/72 |
| 2014/0013774 A1 | 1/2014 | Grunwald et al. | |
| 2014/0054009 A1* | 2/2014 | Chang | H01L 23/427 165/104.11 |
| 2016/0043451 A1 | 2/2016 | Kawaguchi et al. | |
| 2017/0051987 A1* | 2/2017 | Vanerwees | F28F 9/02 |
| 2017/0131035 A1* | 5/2017 | Honnorat | B64D 27/10 |
| 2017/0246934 A1* | 8/2017 | Lee | F25B 6/04 |

FOREIGN PATENT DOCUMENTS

| | | |
|---|---|---|
| CN | 102748979 A | 10/2012 |
| CN | 103038919 A | 4/2013 |
| CN | 104040782 A | 9/2014 |
| CN | 104466296 A | 3/2015 |
| DE | 19646349 A1 | 5/1998 |
| DE | 102009015351 A1 | 9/2010 |
| EP | 2679932 A3 | 2/2015 |
| JP | 2013543239 A | 11/2013 |
| JP | 2014507760 A | 3/2014 |
| JP | 2014509441 A | 4/2014 |
| WO | 2015113161 A1 | 8/2015 |
| WO | 2016033694 A1 | 3/2016 |

OTHER PUBLICATIONS

Translation of CN 102748979 (Year: 2012).*
International Search Report and Written Opinion Issued in Corresponding PCT Application No. PCT/FR2017/051984, dated Oct. 17, 2017 (9 pages with English Translation of International Search Report).
First Office Action in corresponding Chinese Application No. 201780057624.9, dated May 21, 2020 (12 pages).
Notice of Reason for Rejection in corresponding Japanese Application No. 2019-503735, dated May 19, 2020 (11 pages).
Second Office Action in corresponding Chinese Application No. 201780057624.9, dated Mar. 10, 2021 (13 pages).

* cited by examiner

DEVICE FOR COOLING AN ENERGY STORAGE UNIT, AND ASSOCIATED ASSEMBLY

The present invention relates to a device for cooling an electrical energy storage unit, in particular for a motor vehicle battery.

A tube heat exchanger for controlling the temperature of energy storage devices, in particular for a motor vehicle, is known from patent application US2014013774.

A plate heat exchanger is also known from application US2007199333.

However, a disadvantage of these two implementations consists in the modularity of exchangers of this type. In fact, it is difficult to provide exchangers with a complex form because of the elementary structure of these exchangers.

The objective of the invention is in particular to make improvement to at least some of the disadvantages of the prior art.

For this purpose, the invention relates to a device for cooling an electrical energy storage unit, the device comprising at least one tube exchanger and one plate exchanger, the tube exchanger and the plate exchanger being in fluid communication such as to form a circuit for circulation of a cooling fluid.

Thus, the combination of a plurality of types of exchangers, connected to one another such as to form a fluid circuit, makes it possible to implement a modular cooling device. A device of this type can be adapted for example in terms of the number of plate heat exchangers or tube heat exchangers, thus making it possible to adapt to the form or the size which the device must have.

According to an aspect of the invention, the plate exchanger and the tube exchanger have a complementary connection interface.

Thus, a certain sealing of the cooling device is ensured, and the connection between the two types of exchanger is facilitated.

According to a variant, the plate exchanger and the tube exchanger are connected by brazing.

Thus, the sealing is ensured by connection means which ensure mechanical strength necessary for the environment in which the exchanger is placed.

A plate exchanger connected to a tube exchanger by adhesion could also be provided.

A plate exchanger and a tube exchanger connected by welding could also be provided.

According to one embodiment, the tube exchanger comprises a plurality of tubes.

Thus, this makes it possible to use known exchangers, and therefore to limit the production costs of the invention.

According to an aspect of the invention, the plate exchanger comprises at least one pair of plates forming channels for circulation of the cooling fluid.

Thus, this makes it possible to use known exchangers, and therefore to limit the production costs of the invention.

According to one embodiment of the invention, the plates are made of stamped aluminum.

According to another embodiment, aluminum plates deformed by hydroforming could also be provided.

According to another embodiment, aluminum plates formed by roll bounding could also be provided.

According to another aspect of the invention, the tube exchanger is placed between a plurality of pairs of plates.

According to a variant of the invention, the plate exchanger is placed between a plurality of tubes.

According to another embodiment of the invention, the plates have a thickness greater than the thickness of the tubes.

The invention also relates to a cooling assembly of an electrical energy storage unit, the assembly comprising at least one device according to one of the embodiments described.

According to one embodiment of the invention, the assembly also comprises at least one other plate exchanger and/or one other tube exchanger.

The invention will be better understood, and other details, characteristics and advantages of it will become more apparent in the light of the following description, provided by way of non-limiting illustration, and with reference to the appended drawings in which.

A first embodiment of the invention is now described in relation with FIGS. 1 to 5.

An electrical energy storage unit can for example be an electric battery, in particular an electric battery for a motor vehicle. An electric battery of this type can for example be composed of a plurality of electric cells. In order to obtain a better electrical storage capacity, a plurality of electric batteries can be used, disposed according to an advantageous arrangement, such as to use the spaces left available in a motor vehicle. Thus, it is important to be able also to modulate the cooling assembly of this electrical energy storage unit in order to optimize its cooling, and therefore its performance and service life.

As illustrated in these figures, the device 2 for cooling an electrical energy storage unit comprises at least one tube exchanger 3 and one plate exchanger 4.

Figure 5:
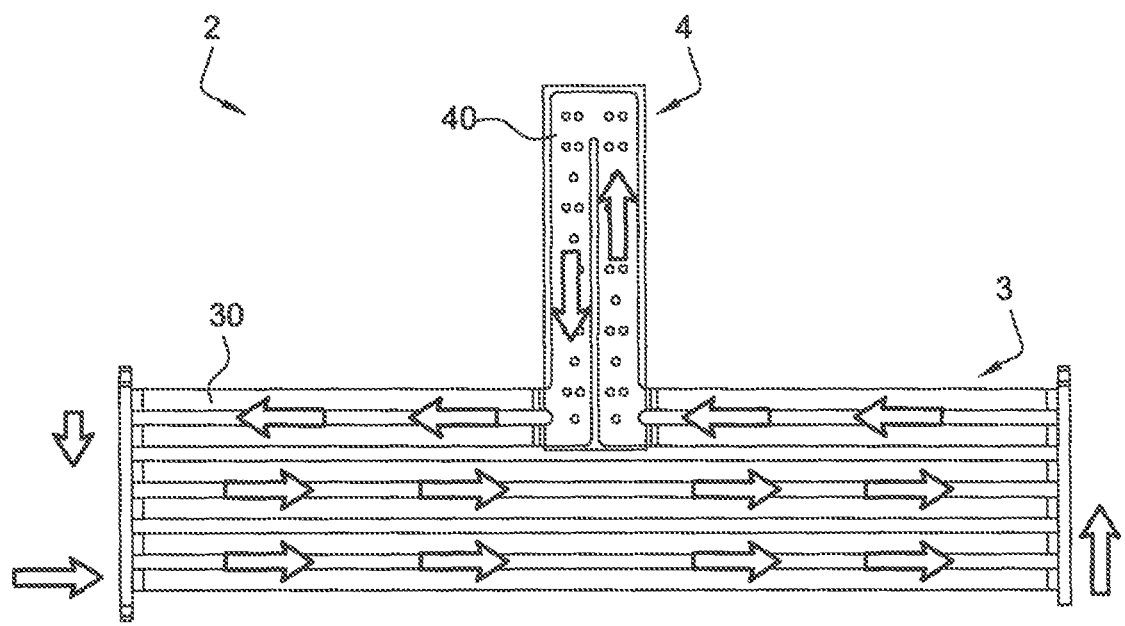
FIG. 5 shows a cooling device according to an embodiment of the invention.

The cooling device 2 which is illustrated in FIG. 5 comprises a plate exchanger 4 and a tube exchanger 3.

In this example, the tube exchanger 3 comprises a plurality of tubes 30 for circulation of cooling fluid.

In this example, the plate exchanger illustrated comprises a pair of plates 40 forming channels for circulation of the cooling fluid.

These cooling channels can have a profile in the form of a "U". They can also have a profile in the form of an "S".

It will be appreciated that it would be possible to implement a plate exchanger which comprises a plurality of pairs of plates 40.

In this example, the plates are stamped. Thus, the surfaces of the plates comprise disruptive elements, which makes it possible to improve the circulation of the cooling fluid.

The tube exchanger 3 and the plate exchanger 4 are in fluid communication, such as to form a circuit for circulation of a cooling fluid.

Figure 3:
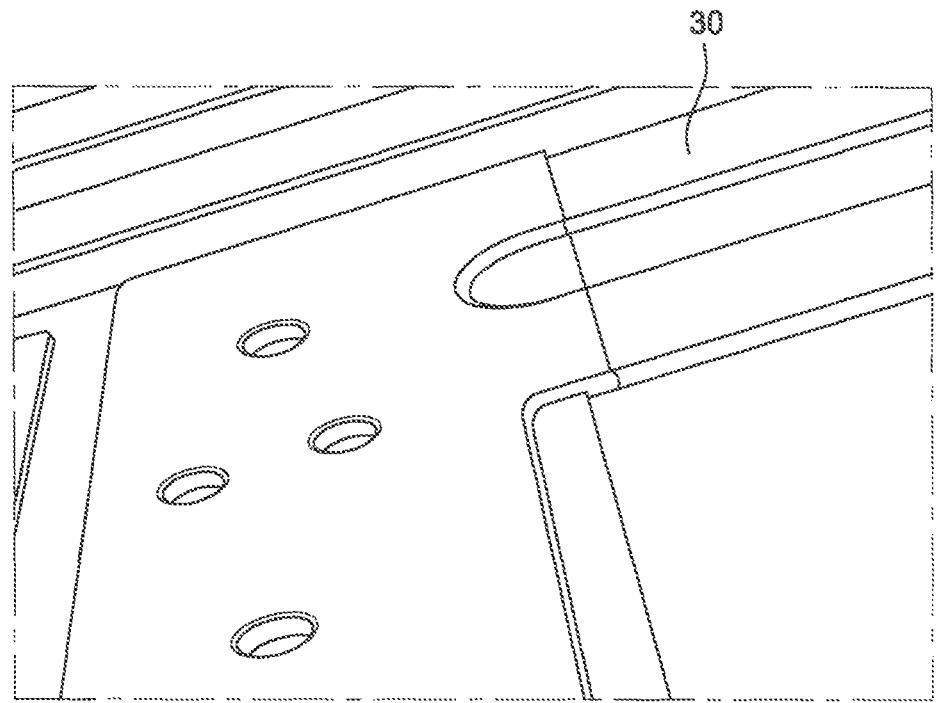
FIG. 3 is a detailed view in perspective of a device according to an embodiment of the invention.
Figure 4:
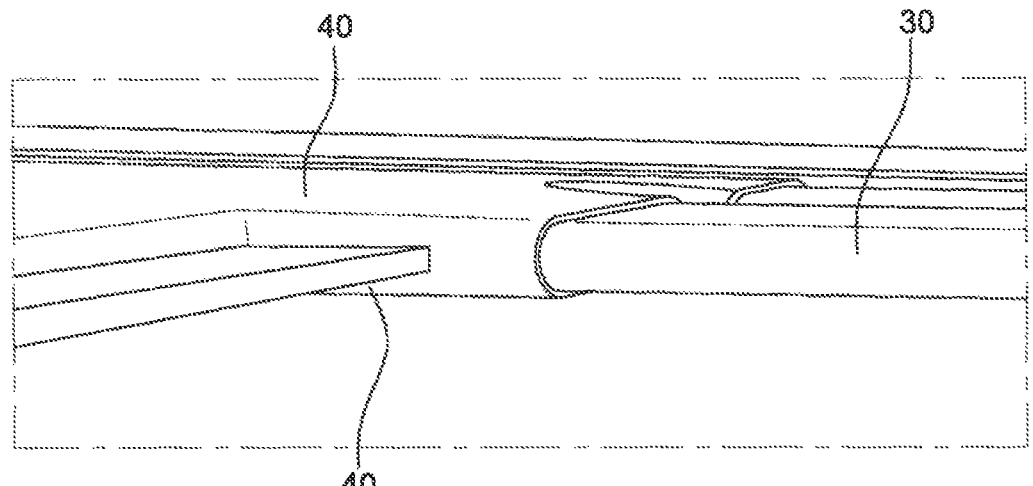
FIG. 4 is a detailed lateral view of a device according to an embodiment of the invention.

As can be seen more particularly in FIGS. 3 and 4, the plate exchanger 4 and the tube exchanger 3 have a complementary connection interface.

As illustrated in FIG. 4, the plate exchanger 4 has a thickness greater than that of the tube exchanger 3. In other words, the tube exchanger has a smaller thickness at its tubes than that of the plate exchanger.

In this example, the plates 40 have a thickness of between 2 ram and 50 mm, whereas the tubes have a thickness of between 1.5 mm and 49 mm.

Thus, the plates 40 have a thickness greater than the thickness of the tubes 30.

The cooling device which is illustrated in FIG. 5 has a plate exchanger 4 placed between a plurality of tubes 30.

More particularly, it can be seen that the plates 40 of the plate exchanger 4 are connected to the tube exchanger by two tubes 30.

According to other embodiments, plates 40 placed between more than two tubes 30 of the tube exchanger 3 could be envisaged.

Plates connected to a single tube could also be envisaged.

According to a particular embodiment of the invention, the plate exchanger 4 and the tube exchanger 3 are connected by brazing. In other words, one or a plurality of tubes 30 is/are connected to one or a plurality of pairs of plates 40 by brazing.

By this means, the sealing is ensured between the tube exchanger 3 and the plate exchanger 4 at the connection interface.

Figure 1:
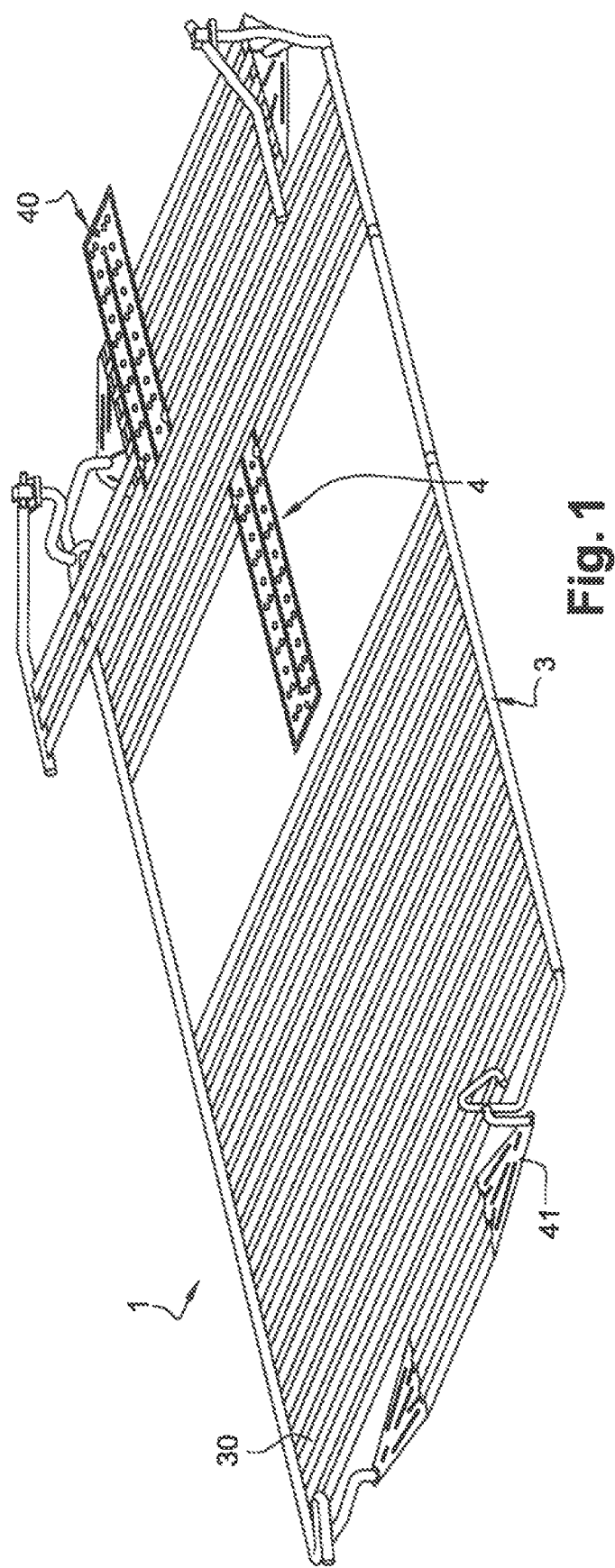
FIG. 1 is a view in perspective of an assembly according to an embodiment of the invention.
Figure 2:
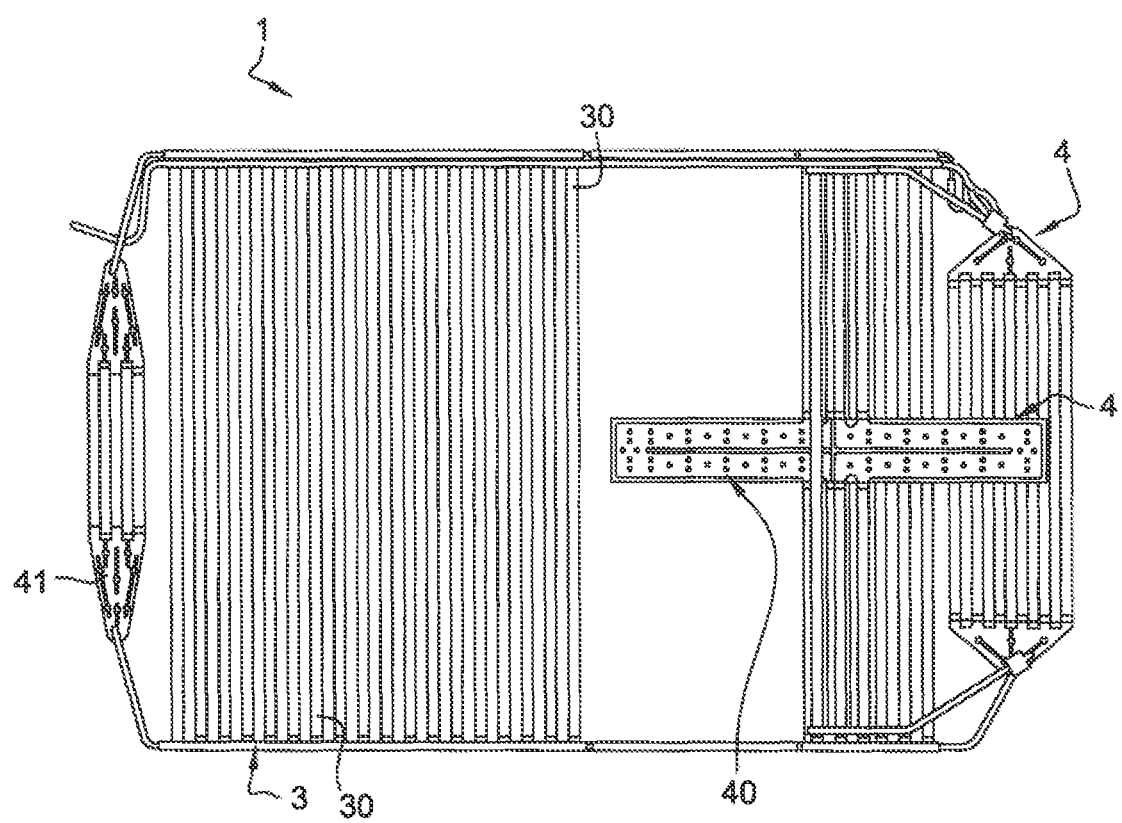
FIG. 2 is a view from above of the assembly according to the embodiment in FIG. 1.

As illustrated in FIGS. 1 and 2, the cooling assembly comprises a plurality of cooling devices.

By this means, the cooling assembly makes it possible to cool a plurality of energy storage cells, and is adapted to a required form.

Thus, the assembly is modular, since the dimensions depend on the number of cooling devices implemented, and additional exchangers added.

The assembly can also comprise at least one other plate exchanger and/or tube exchanger.

The different devices are also in fluid communication, such as to form a circuit for circulation of a cooling fluid.

The circuit can be completed by at least one input manifold and/or output manifold provided in the fluid circulation circuit.

According to one embodiment, there can also be a fluid input and a fluid output.

The assembly illustrated in FIG. 1 comprises four cooling devices 2, as well as two additional tube heat exchangers 3.

For two of the cooling devices illustrated in FIG. 1, the tube exchanger is placed between a plurality of pairs of plates 41.

In this example, the plates 41 have a substantially triangular profile. However, it would be possible to conceive of other embodiments in which the plates 41 would have a different profile, such as a rectangular profile or a rhombus.

For two of the cooling devices illustrated in FIG. 1, the plate exchanger is placed between a plurality of tubes.

The two additional tube heat exchangers are placed in series with the cooling devices in this example.

It can be seen in FIG. 1 that the cooling assembly is not necessarily flat. In fact, in this embodiment, three of the devices are placed on a different plane.

The invention is not limited to the embodiments illustrated in the different figures. It will be appreciated that it would be possible to conceive of embodiments with other configurations combining another number of cooling devices.

It would also be possible to conceive of other embodiments in which a plurality of independent circuits exist.

The invention claimed is:

1. A device for cooling an electrical energy storage unit, the device comprising:
    at least one tube exchanger; and
    at least one plate exchanger,
    the at least one tube exchanger and the at least one plate exchanger being in fluid communication such as to form a circuit for circulation of a cooling fluid,
    wherein the at least one plate exchanger and the at least one tube exchanger have a complementary connection interface that directly connects the at least one plate exchanger and the at least one tube exchanger to each other,
    wherein the at least one plate exchanger comprises at least one pair of plates forming channels for circulation of the cooling fluid, and
    wherein the channels formed by the at least one pair of plates have a "U" profile or an "S" profile.

2. The device as claimed in claim 1, the at least one plate exchanger and the at least one tube exchanger being connected by brazing.

3. The device as claimed in claim 1, the at least one tube exchanger comprising a plurality of tubes.

4. The device as claimed in claim 1, the plates being made of stamped aluminum.

5. The device as claimed in claim 1, the at least one tube exchanger being placed between a plurality of pairs of plates.

6. The device as claimed in claim 3, the at least one plate exchanger being placed between at least two of the plurality of tubes.

7. The device as claimed in claim 1, the plates having a thickness greater than the thickness of the tubes.

8. A cooling assembly of an electrical energy storage unit, the cooling assembly comprising:
    at least one cooling device comprising:
        at least one tube exchanger; and
        at least one plate exchanger,
        the at least one tube exchanger and the at least one plate exchanger being in fluid communication such as to form a circuit for circulation of a cooling fluid,
    wherein the at least one plate exchanger and the at least one tube exchanger have a complementary connection interface that directly connects the at least one plate exchanger and the at least one tube exchanger to each other,
    wherein the at least one plate exchanger comprises at least one pair of plates forming channels for circulation of the cooling fluid, and
    wherein the channels formed by the at least one pair of plates have a "U" profile or an "S" profile.

9. The assembly as claimed in claim 8, further comprising at least one second plate exchanger and/or second tube exchanger.

10. The cooling assembly of claim 8, wherein the cooling assembly is modular, adaptable to cool a plurality of energy storage cells, wherein dimensions of the assembly and a number of plate exchangers and a number of tube exchangers depend on a number of cooling devices implemented.

11. A device for cooling of an electric battery for a motor vehicle, the device comprising:
    a tube exchanger; and
    a plate exchanger,
    the tube exchanger and the plate exchanger being connected at a connection interface and in fluid communication such as to form a circuit for circulation of a cooling fluid,
    wherein the plate exchanger comprises at least one pair of plates forming channels for circulation of the cooling fluid, wherein the connection interface is a complementary connection interface that directly connects the plate exchanger and the tube exchanger to each other, and wherein the channels formed by the at least one pair of plates have a "U" profile or an "S" profile.

12. The cooling device of claim 11, wherein the at least one pair of plates are deformed by hydroforming.

13. The cooling device of claim 11, wherein the at least one pair of plates have a triangular profile.

14. The cooling device of claim 11, wherein the tube exchanger comprises a plurality of tubes, and wherein the tube exchanger has a smaller thickness at the tubes than a thickness of the plate exchanger.

15. The cooling device of claim 14, wherein the at least one pair of plates have a thickness of between 2 mm and 50 mm, and the plurality of tubes have a thickness of between 1.5 mm and 49 mm.

16. The cooling device of claim 14, wherein the at least one pair of plates of the plate exchanger is connected to the tube exchanger via at least one of the plurality of tubes of the tube exchanger.

17. The cooling device of claim 16, wherein at least one of the plurality of tubes is connected to the at least one pair of plates by brazing, facilitating sealing between the tube exchanger and the plate exchanger at the connection interface.

* * * * *